Oct. 18, 1966   A. J. KRAUSE   3,279,516
NUT THREAD LOCK
Filed Feb. 17, 1964

INVENTOR.
ALBERT J. KRAUSE

United States Patent Office 3,279,516
Patented Oct. 18, 1966

3,279,516
NUT THREAD LOCK
Albert J. Krause, 407 3rd Ave., Seattle, Wash.
Filed Feb. 17, 1964, Ser. No. 345,298
1 Claim. (Cl. 151—19)

This invention relates to lock-nut assemblies and more particularly to such assemblies comprising a two part nut.

The primary object of the present invention is to provide nut locking assemblies with improved holding ability and increased resistance to slipping when subjected to operating strain and vibration.

It is a further object of the invention to provide improved lock-nut assemblies comprising only three relatively simple members which may be readily positioned or repositioned on threads of a bolt without marring the crests of the bolt threads.

In attaining these and other objects the present invention provides, in combination with a headed bolt having a threaded shank, a two part nut assembly, one of the nut parts having a slotted extension for the reception of a key of unique configuration which impinges on the roots only of the bolt threads and the second nut part being adapted to wedge the key into impingement with the roots only of the bolt threads and to grippingly engage the first nut part.

Figure 1:
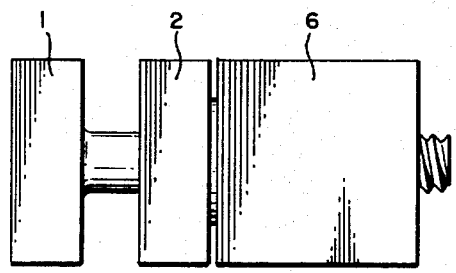
Figure 2:
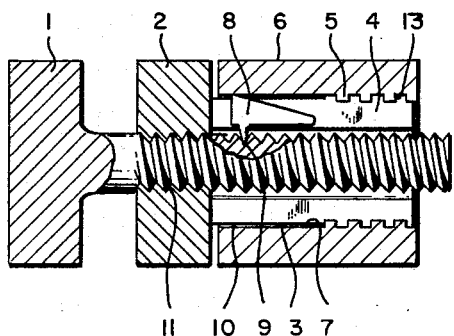
Figure 3:
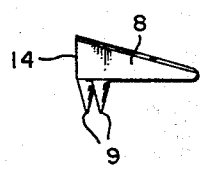
Figure 4:
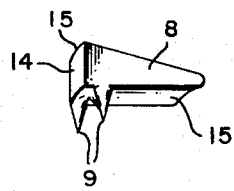
Figure 5:
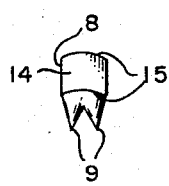
Figure 6:
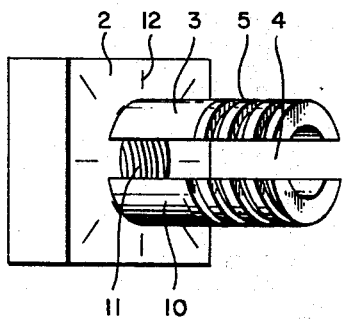
Figure 7:
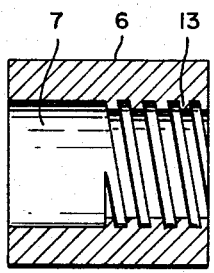
Figure 8:
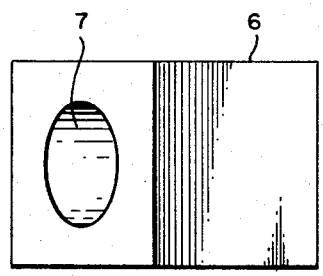

Additional objects and advantages will become apparent as the description proceeds in connection with the accompanying drawings in which:

FIGURE 1 is a side view of the lock-nut assembly in operative position;
FIGURE 2 is a vertical section of the assembly;
FIGURE 3 is a side view of the key of the present invention;
FIGURE 4 is a perspective view of the key;
FIGURE 5 is an end view of the key;
FIGURE 6 is a perspective view of one of the locking nut parts;
FIGURE 7 is a vertical section of the co-operating lock nut part; and
FIGURE 8 is a perspective view of the nut part shown in FIGURE 7.

Referring now more particularly to the drawings bolt 1, to which the locking assembly is applied, has a flanged head and a standard threaded shank. Base nut 2 has an integral extension 3, the nut having a threaded bore 11 and the extension having a smooth cylindrical portion 10. The outer end of the extension is provided with an external square worm thread 5. A slot 4 extends transversely across the extension 3. The radial outer face of the base nut 2 is provided with locking ribs 12.

The key or inlay 8 shown separately in FIGURES 3, 4 and 5, is longitudinally tapered from its thicker end 14 and is provided with exterior and interior transversely curved faces 15. Two or more flat sided V-shaped pointed teeth extend inwardly from the inner surface 15. The teeth 9 are off-set axially of the key by an amount corresponding to the pitch of the threads of bolt 1. The co-operating nut part 6 has a cylindrical bore 7 extending part way through the nut, the remainder of the nut having a square worm thread 13 adapted to be threaded on nut part 2.

In use, the base nut 2 is screwed on to the threaded stem of the bolt. Inlay or key 8 is then positioned in the recess 4 of the extension 3 of the base nut 2 with its thicker end 14 facing the ribbed surface 12. The co-operating nut 6 is then screwed onto the thread 5 of the base nut extension 3 to dispose the smooth bore 7 in wedging engagement with the outer surface of the key 8. The nut 6 is screwed tightly against the ribbed outer radial face of the base nut 2 and, as the inward motion of the nut 6 progresses, the nut pregressively forces the points of the teeth into the root portions only of the threads on the bolt 1. When the parts are in this position they are held securely against accidental dislodgement or loosening. Since the crests of the threads of the bolt 1 are undamaged during the locking operation the parts 2, 6, and 8, may be removed and repositioned as desired along the length of the threaded shank of the bolt.

What is claimed and desired to be secured by Letters Patent is:

A bolt and nut lockable fastener comprising: a headed bolt with threaded shank; a first base nut having inner and outer ends with the inner end thereof being closer to the bolt head, said base nut having a standard nut portion threaded internally for threading on the bolt threads and a longitudinally slotted integral tubular extension nut portion threaded externally and having a smooth-walled cylindrical bore intersected by said slot, said standard nut portion having a flange adjacent its inner end and extending radially outwardly beyond said tubular extension nut portion with protuberances on the outer radial surface thereof; a key fitted within the slot of the tubular extension nut portion near the standard nut portion of said first base nut, said key having a gradually increasing radial dimension and said key having arcuate inner and outer surfaces conforming essentially with the form of said bolt and said nut, said key having at least two spaced teeth which are axially offset to match the lead of the bolt thread, said teeth being of a depth exceeding the bolt thread depth projecting radially inwardly into said bore for engagement with the bolt thread; a second co-operating nut internally threaded for turning on the external threads of the tubular extension nut portion to progressively engage the radially outer portion of the key, thereby impinging the key teeth into only the root structure of the bolt thread, and to grippingly contact the outer radial surface of the flange on the standard nut portion of the first base nut said co-operating threads on the said tubular extension nut portion and said second co-operating nut being located only on a portion of the length of each remote from said standard nut portion of the first base nut, thereby establishing continuing re-use capability of the lockable fastener without causing interferring thread damage.

References Cited by the Examiner
UNITED STATES PATENTS

| | | | |
|---|---|---|---|
| 635,361 | 10/1899 | Titus | 151—19 |
| 655,118 | 7/1900 | Reis | 151—24 |
| 852,841 | 5/1907 | Jennings | 151—19 |
| 902,646 | 11/1908 | Conn. | |
| 1,182,892 | 5/1916 | Brown | 151—19 |
| 1,293,180 | 2/1919 | Pace | 151—19 |
| 1,657,244 | 1/1928 | Dardelet | 151—19 |
| 2,424,242 | 7/1947 | Krause | 151—19 |

CARL W. TOMLIN, *Primary Examiner.*
R. S. BRITTS, *Assistant Examiner.*